(No Model.)
G. WILLING.
TIRE AND FELLY CLAMP.
No. 547,055. Patented Oct. 1, 1895.
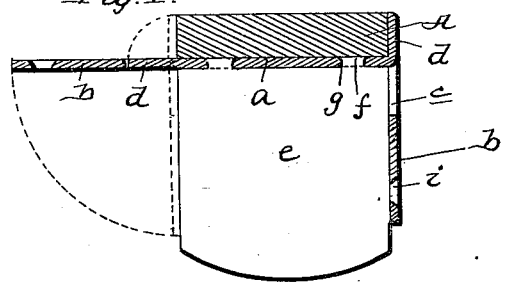
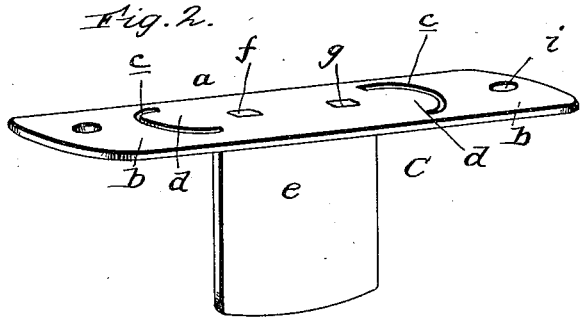
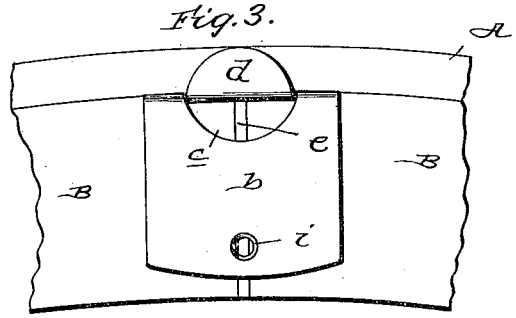
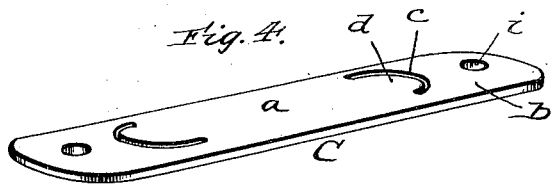
Witnesses:
Inventor
George Willing
By James J. Sheehy
Attorney

UNITED STATES PATENT OFFICE.

GEORGE WILLING, OF BROKEN BOW, NEBRASKA.

TIRE AND FELLY CLAMP.

SPECIFICATION forming part of Letters Patent No. 547,055, dated October 1, 1895.

Application filed July 15, 1895. Serial No. 556,062. (No model.)

*To all whom it may concern:*

Be it known that I, GEORGE WILLING, a citizen of the United States, residing at Broken Bow, in the county of Custer and State of Nebraska, have invented certain new and useful Improvements in Tire and Felly Clamps; and I do declare the following to be a full, clear, and exact description of the invention, such as will enable others skilled in the art to which it appertains to make and use the same.

My invention relates to improvements in that class of tire and felly clamps which are adapted to be applied to new or old wheels without the employment of skilled labor, and it is designed more particularly as an improvement upon the clamp disclosed in my Letters Patent, dated April 30, 1895, No. 538,361.

The general object of my present invention is to provide a tire and felly clamp which may be readily changed to suit it to new or old wheels and one which by reason of its construction may be very easily and cheaply formed of steel or other suitable material.

Other objects and advantages of the invention will be fully understood from the following description and claims, when taken in connection with the annexed drawings, in which—

Figure 1 is a sectional view illustrating the manner of applying my improved clamp to an old wheel which has more or less space between the contiguous ends of the felly. Fig. 2 is a perspective view of the clamp as adapted to be applied to an old wheel. Fig. 3 is a side elevation showing the clamp in position upon an old wheel, and Fig. 4 is a view of a slightly modified form of clamp designed for use on new wheels where there is little or no space between the contiguous ends of the felly.

Referring by letter to said drawings, and more particularly to Figs. 1 to 3 thereof, A indicates a wheel-tire, and B indicates two sections of the felly, all of which may be of the form and construction usually employed on vehicle-wheels, or they may be of any approved character.

C indicates my improved clamp, which may be formed of steel or other suitable material, and may therefore be made very thin, so as to obviate the objectionable necessity of recessing the felly to receive it. This clamp is made in two pieces or sections, and it comprises the body portion $a$, which is designed to be interposed between the felly-sections and tire and is sufficiently long to permit of its extended portions or branches $b$ being bent down against the sides of the felly-sections, as shown in Figs. 1 and 3, and is provided with the curved slits or openings $c$ to form the short branches $d$, designed to be bent up against the opposite edges of the tire and the plate $e$, which is provided with projections to engage apertures $f$ in the body portion $a$ and is designed to be arranged between the contiguous ends of the felly-sections and occupy the space between said ends, so as to hold them firm and solid, and at the same time hold the body portion $a$ against casual movement. The body portion $a$ and the plate $e$ are detachably connected together, and the said body portion is made flat at the time of manufacture, but stamped to permit of it being bent, as before described, and it will therefore be appreciated that in storing or transporting the clamps the plates $e$ may be placed flat on the body portions $a$, and therefore a large number of the clamps may be packed in a small space, which is a desideratum.

When the clamp is placed on new wheels in which there is no space between the contiguous ends of the felly, the body portion $a$ alone is employed, and it is provided adjacent to its ends with apertures $i$ to receive rivets or bolts, which are designed to enter the felly and hold the clamp against casual movement. The rivets or bolts are not employed when the plate $e$ is; but as the provision of the holes $i$ does not materially increase the cost of the clamp I prefer to provide all of the plates forming the body portion $a$ with holes, so as to permit of them being used on new wheels without the plates $e$ when desired.

When the clamps are placed on the market for use on old wheels only, the holes $i$ may be omitted and the rivets or bolts dispensed with, as the plate $e$ will serve to hold the clamps against casual movement.

In applying my improved clamp to an old wheel the projections of the plate $e$ are placed in the apertures $g$ of the body portions, and one of the short branches $d$ of the said body portion is bent upwardly into a vertical position, and the adjacent long branch $b$ is bent downwardly. With the parts in the positions stated the device is forced into position in the wheel, as shown in Fig. 1, after which the other branches $d$ and $b$ of the body portion are bent up and down, respectively. When thus placed in position, the clamp will serve to securely hold the tire and felly sections against movement with respect to each other and will materially strengthen the wheel without materially increasing the weight thereof. When the body portion $a$ is employed without the plate $e$ on a new wheel, said body portion is placed in position in the manner above described.

Having described my invention, what I claim is—

1. The tire and felly clamp described consisting essentially of the flat body portion having the slits $c$, at intermediate points of its length and adapted to be bent so as to form the long branches $b$, for engaging the opposite sides of a felly and the short branches $d$, extending in an opposite direction to the long branches $b$, and adapted to engage the opposite edges of a tire, substantially as and for the purpose set forth.

2. The tire and felly clamp described, consisting essentially of the flat body portion having the slits $c$, at intermediate points of its length and the apertures $g$, between the slits $c$ and adapted to be bent so as to form the long branches $b$, for engaging the opposite sides of a felly, and the short branches $d$, extending in an opposite direction to the long branches $b$, and adapted to engage the opposite edges of a tire, and the plate $e$, formed separate from the body portion and adapted to be arranged between the contiguous ends of a felly and having projections adapted to enter the apertures $g$, of the body portion $a$, substantially as specified.

In testimony whereof I affix my signature in presence of two witnesses.

GEORGE WILLING.

Witnesses:
C. H. HOLCOMB,
JOE SKELTON.